UNITED STATES PATENT OFFICE.

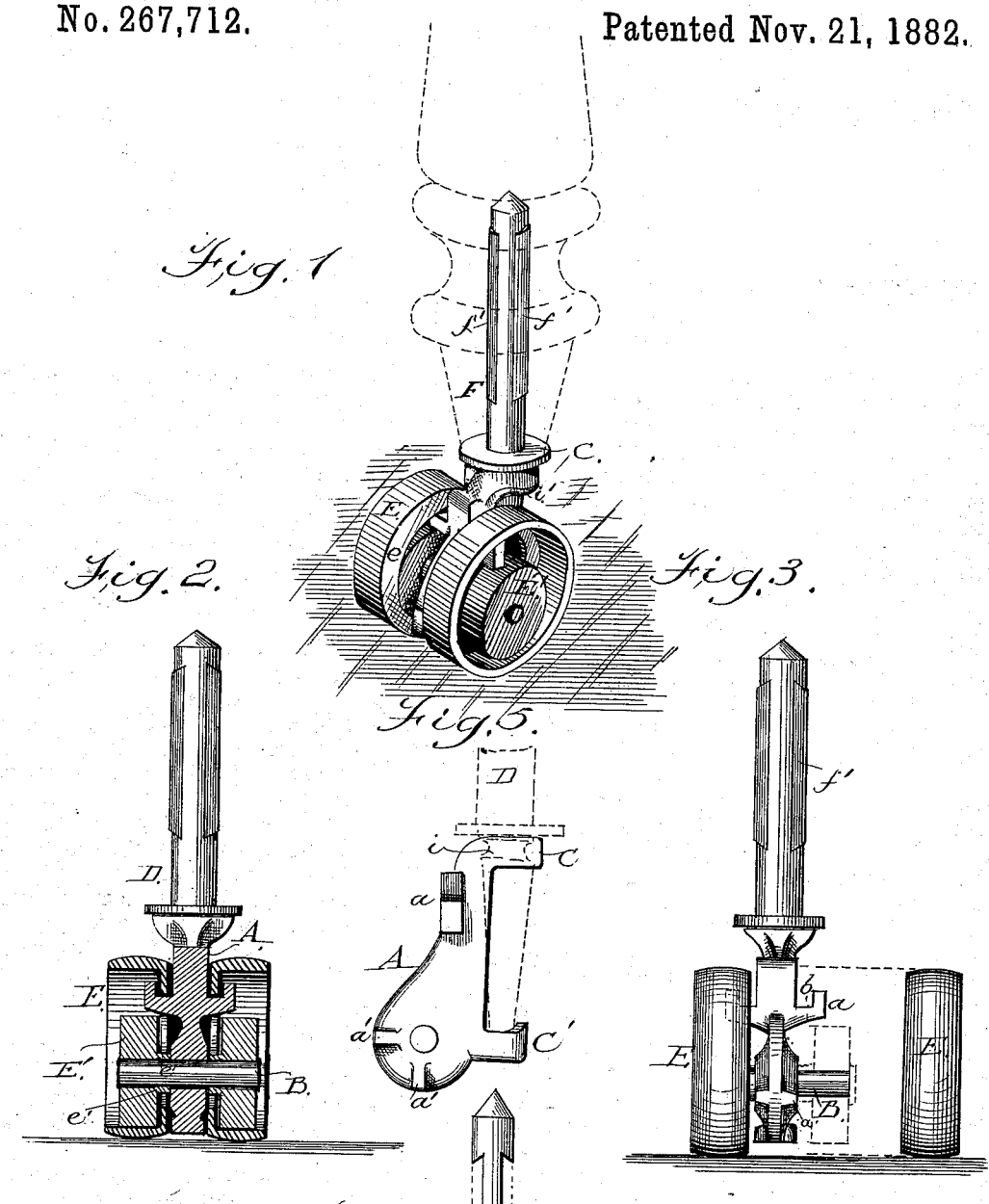

OLE PEDERSON, OF COLUMBUS, OHIO, ASSIGNOR TO R. G. JORDAN AND D. C. MEEHAN, OF SAME PLACE.

CASTER.

SPECIFICATION forming part of Letters Patent No. 267,712, dated November 21, 1882.

Application filed September 19, 1882. (No model.)

*To all whom it may concern:*

Be it known that I, OLE PEDERSON, of Columbus, in the county of Franklin and State of Ohio, have invented certain new and useful Improvements in Furniture-Casters; and I do hereby declare the following to be a full, clear, and exact description, reference being had to the accompanying drawings, making a part of this specification, in which—

Figure 1 is a perspective view of a caster with my improvements attached. Fig. 2 is a section through X X of Fig. 1. Fig. 3 is a rear elevation, with one of the large wheels removed. Fig. 4 shows the grooves in the stem to receive the pieces of wood. Fig. 5 shows a side elevation of the shank.

My invention relates to certain improvements in furniture-casters, and is an improvement on Patent No. 218,565, issued to me August 12, 1879; and it consists in the several combinations of devices hereinafter explained and claimed.

To enable others skilled in the art to make and use my invention, I will proceed to describe the exact manner in which I have carried it out.

In the drawings, A is the shank of the caster, rigidly attached to the axle B. This shank is provided with the collar C and step C' to sustain the stem D. The shank is also provided with bearings $a$ $a'$, against which the large wheels play and by which these wheels are held in place. The bearing $a$ has the shape of an inverted T, as shown in Fig. 2. The spaces $b$ in the bearing $a$ hold the upper part of the flange of the large wheels E, as shown in Figs. 1 and 2. In order to give these wheels sufficient play to secure proper oscillation to the caster and to prevent the inner wheels, E', from binding, the spaces $b$ are made wider than the thickness of the flange $e$. The large wheels E are held in position around the axle B by means of inner wheels, E', secured to the axle and bearing against the flange $e$, and by the flange $e$ running in the space $b$, as shown in Fig. 2. The wheels E and E' have independent movements, the former having backward and forward play and being revolved by its contact with and friction on the floor, while the latter, fitting on and being attached directly to the axle, is provided with a neck, $e'$, which projects through the large wheel and is revolved by its contact with and friction on the inner periphery of the large wheel, as shown in Fig. 1. By this construction I secure an anti-friction caster, as when the large wheel E meets with any obstruction and is temporarily arrested in its revolution the inner wheel continues to revolve until the large wheel is relieved.

The stem F may be either cast or drawn from wrought-iron, and is provided with one or more spaces, $f$, on its sides for the insertion of strips or pieces $f'$ of wood. These pieces of wood may be secured in the spaces $f$ in any convenient way. I prefer making transverse dovetail grooves, as shown in Fig. 4, and fitting into them the pieces of wood. The object of this construction of the stem is to enable me to firmly secure the caster to the furniture by glue. I simply dip the stem in glue and then place it in the hole prepared to receive it. The shank is secured to the stem by means of groove $i$ around the stem, into which the lip $i'$ on shank is forced; or the stem provided with the groove may be placed in the mold and the shank cast over it, as described in my patent before referred to.

Having thus described my invention, what I claim as new, and desire to secure by Letters Patent, is—

1. In a furniture-caster, the inner wheel, E', and the shank A, provided with the axle B, in combination with the large wheels E, all constructed to operate substantially as and for the purpose set forth.

2. The shank A, provided with the axle B and bearings $a$ $a'$, in combination with the wheels E E' and a stem, substantially as and for the purpose set forth.

3. In a furniture-caster, the stem F, provided with spaces or recesses for securing strips of wood, substantially as and for the purpose set forth.

OLE PEDERSON.

Witnesses:
J. M. LOWE,
F. A. SIEGEL.